United States Patent [19]

Devin et al.

[11] 4,148,564

[45] Apr. 10, 1979

[54] SOLAR SENSOR WITH LINEAR CONCENTRATION WITH A FIXED RECEIVER AND MOVABLE MIRRORS

[75] Inventors: Bernard Devin, Gif sur Yvette; Michel Guillemot, Vitry sur Seine, both of France

[73] Assignee: Commissariat a l'Energie Atomique, Paris, France

[21] Appl. No.: 807,291

[22] Filed: Jun. 16, 1977

[30] Foreign Application Priority Data

Jul. 6, 1976 [FR] France .................................. 76 20651

[51] Int. Cl.² .............................................. G02B 5/10
[52] U.S. Cl. ..................................... 350/292; 126/270; 350/293
[58] Field of Search ................. 350/292, 293; 126/270, 126/271

[56] References Cited

U.S. PATENT DOCUMENTS

| | | | |
|---|---|---|---|
| 4,071,017 | 1/1978 | Russell, Jr. et al. | 350/292 X |
| 4,077,392 | 3/1978 | Garner | 350/293 X |

*Primary Examiner*—F. L. Evans

[57] ABSTRACT

Solar sensor with linear concentration with a fixed receiver and movable mirrors.

The solar sensor with a linear concentration comprises a system of elementary segmental mirrors arranged along the generating lines of a cylinder portion and directs the solar rays towards a zone located in the vicinity of a generating line of said cylinder and a receiver having a linear configuration arranged in said zone, wherein the receiver is stationary and means are provided for giving the mirror system a rotational movement without sliding so that the zone at which the reflected rays are directed remains fixed and the direction of the reflected rays remains unchanged when the sun's position changes.

5 Claims, 7 Drawing Figures

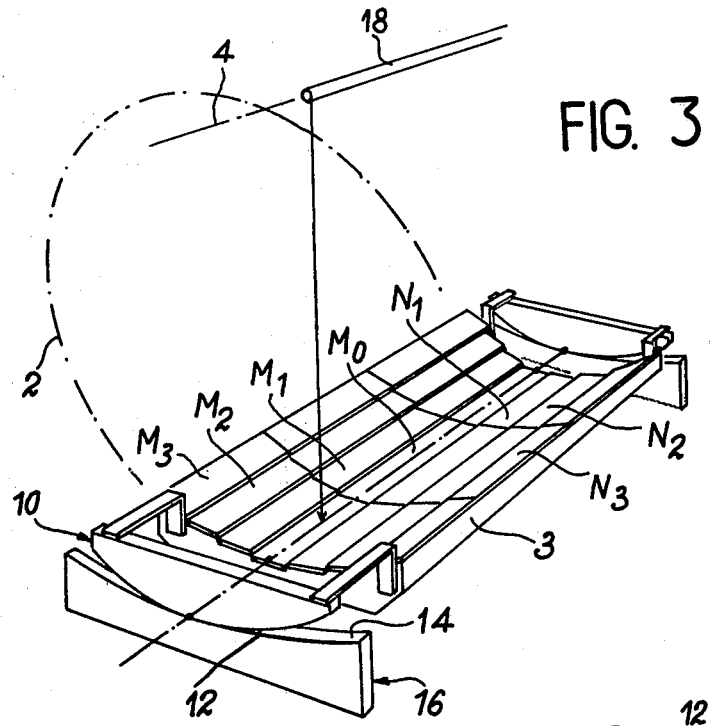
FIG. 3
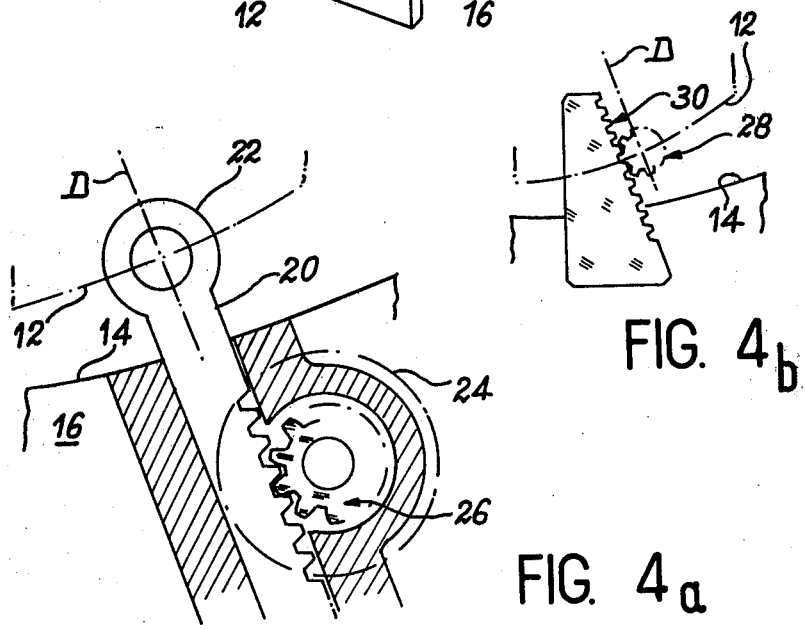
FIG. 4b
FIG. 4a

SOLAR SENSOR WITH LINEAR CONCENTRATION WITH A FIXED RECEIVER AND MOVABLE MIRRORS

BACKGROUND OF THE INVENTION

The present invention relates to a solar sensor with linear concentration whose receiver is fixed and whose mirrors are movable.

Solar sensors with linear concentrations are known which comprise a system of elementary mirrors supported by a cylinder portion and whose orientation is such that the solar rays which they reflect are directed towards a zone located in the vicinity of a generating line of said cylinder. The receiver, which has a linear configuration, is arranged along the said zone. The elementary mirrors can be plane mirrors in which case the zone where the reflected rays cross one another has a width which is substantially equal to the width of one elementary mirror, but they can advantageously be focussing mirrors and preferably cylindrical, in which case the zone where the solar rays converge is a focussing line.

In this type of sensor, the system of mirrors is fixed and the zone where the reflected rays cross one another moves as the position of the sun changes. To ensure that the device has a constant efficiency despite changes in the position of the sun, it is necessary for the receiver to be movable which leads to disadvantages with regard to connections, the sealing of fluid couplings etc.

Solar sensors with linear concentration are also known which comprise a single focussing mirror and a receiver integral with said mirror. In order to take account of variations in the sun's position, the mirror-receiver system can be oriented. However, here again the receiver is not fixed relative to the installation system so that problems with connections and sealing again occur.

BRIEF SUMMARY OF THE INVENTION

The object of the present invention is a solar sensor whose receiver is stationary. This result is obtained by using means which are able to rotate the system of elementary mirrors, whereby the movement is not subject to any sliding so that the zone to which the reflected rays are directed remains fixed relative to the installation system.

The means for the displacement of the system of elementary mirrors provided according to the present invention are applicable no matter what the nature of the segmental mirrors and no matter whether they are plane or cylindrical.

There are two variants of the solar sensor according to the invention and the first is characterised in that it comprises means permitting the rotation without sliding of the cylinder portion which supports the mirror on a cylinder portion whose radius is equal to the diameter of the first portion and whose axis coincides with the receiver having a linear configuration. The second variant is characterised in that the cylinder portion supporting the mirrors is integral with a cylinder portion whose radius is equal to the diameter of the first portion and which rotates without sliding on a plane.

BRIEF DESCRIPTION OF THE DRAWINGS

The features and advantages of the invention can be gathered from the following description with reference to illustrative and non-limitative embodiments and the attached drawings, wherein show:

FIG. 3, in perspective the solar sensor in said first variant;

FIG. 4a and 4b, diagrammatically two embodiments of the means permitting the rotation without sliding of the supporting cylinder in the second cylinder;

DETAILED DESCRIPTION OF THE PREFERRED EMBODIMENTS

Figure 1:
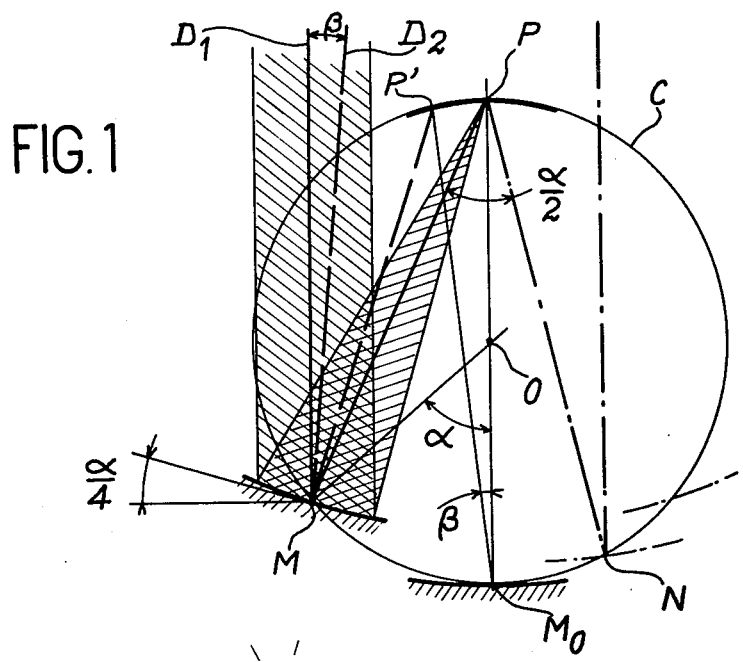
FIG. 1, a geometrical representation illustrating certain properties of cylindrical segmental mirrors.

FIG. 1 illustrates the operating principle of solar sensors with segmental mirrors. It corresponds to the special case where the mirrors are cylindrical and with a radius of curvature which is double the diameter of the mirror supporting cylinder, but in principle it also applies to sensors with plane mirrors.

In FIG. 1 the mirrors $M_0$, M and N are arranged on a circle C of centre O. Mirror $M_0$ is tangential to circle C and is called the base mirror. If the angle at the centre defining the position of a mirror M relative to the diameter $OM_0$ is designated by $\alpha$ the plane tangential to mirror M forms an angle $\alpha/4$ with the direction of the base mirror. Naturally there can be a random number of mirrors M and N arranged on either side of base mirror $M_0$. Each mirror has a radius of curvature equal to double the diameter of circle C. The incident light rays of direction $D_1$ parallel to diameter $OM_0$ are focussed at a point P. Point P is on circle C because the value of angle $M_0PM$ is $\alpha/2$ in such a way that said angle is inscribed in circle C. If the mirrors were plane a focal line would not be obtained at P but instead a zone would be obtained where the reflected rays cross and in this case the width of said zone would be equal to the width of the mirror.

When the direction of the incident light rays varies by an angle $\beta$ and passes from $D_1$ to $D_2$, the light rays reflected by mirror M are focussed at a point P' which differs from P if the mirrors are fixed but which is also located on circle C because the angle $M_0P'M$ retains its value $\alpha/2$.

In the prior art the receiver is positioned along the focussing line and it follows the displacement of the latter as the position of the sun changes. Therefore means must be provided to move the receiver from position P to position P'. According to the present invention, these receiver displacement means are substituted by displacement means for the mirror system in such a way that the receiver can be kept stationary.

According to a first embodiment, these means are able to rotate without sliding the cylinder portion supporting the mirrors on a second cylinder portion whose radius is equal to the diameter of the supporting cylinder. The special properties of this device are illustrated by means of the geometrical representation of FIG. 2.

Figure 2:
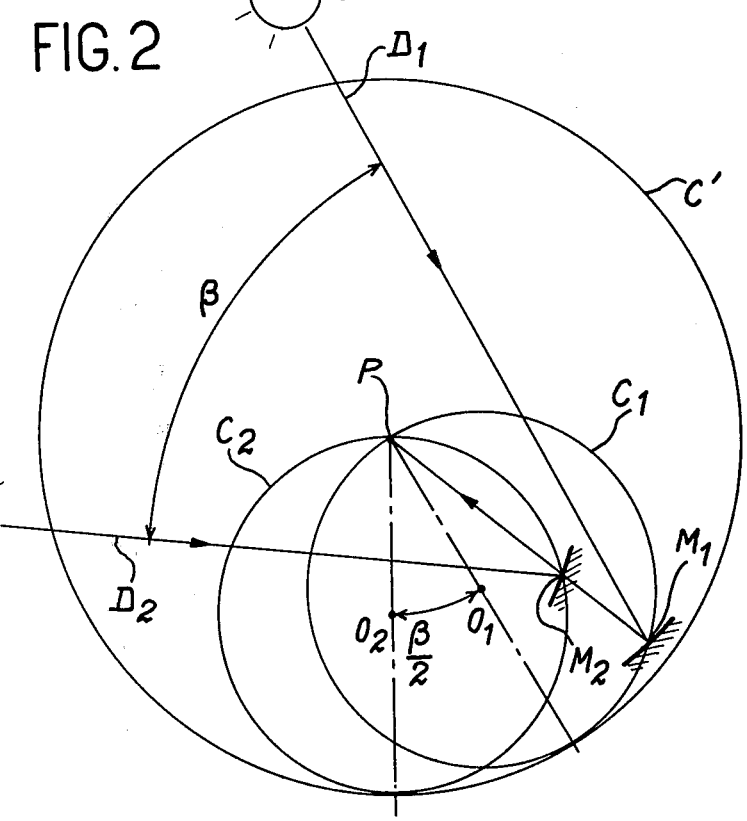
FIG. 2, a geometrical representation illustrating the first variant of the invention in which the mirror supporting cylinder rotates without sliding in a cylinder with double the radius.

In FIG. 2 only one of the mirrors is shown for simplification purposes. It is in position $M_1$ when the incident solar rays have a direction $D_1$ and in position $M_2$ when the solar rays have a direction $D_2$. Directions $D_1$ and $D_2$ form between them an angle $\beta$. When the incident light rays have a direction $D_1$ the circle representing the cross-section of the cylinder which supports the mirrors occupies position $C_1$ and its centre is at $O_1$. The light rays reflected by cylindrical mirror $M_1$ are focussed at point P which belongs to circle $C_1$. This circle can rotate without sliding on a circle $C'$ of centre P and of radius equal to the diameter of circle $C_1$. When the position of the sun has changed the direction of the light rays changes from $D_1$ to $D_2$. Circle $C_1$ in its nonsliding rotating movement arrives at $C_2$ and the centre $O_1$ arrives at $O_2$. The mirror which is linked with the circle passes from position $M_1$ to position $M_2$.

It is known that a point linked with a circle C which rotates without sliding on a circle $C_1$ of double the radius and within said circle describes a diameter of the circle $C'$. The centre of the mirror linked with circle C thus moves along a diameter of circle $C'$ when it passes from position $M_1$ on $C_1$ to position $M_2$ on $C_2$. Point P which is the centre of the large circle $C'$ remains fixed in this movement. The mirror pivots by a certain angle on passing from $M_1$ to $M_2$ and the light rays which it reflects are subject to a double angle deviation.

If the reflected rays are to retain the direction $PM_2M_1$ in such a way that point P, i.e. the receiver still receives the reflected rays from an unchanged direction when the solar rays have their incidence which varies by an angle $\beta$ on passing from direction $D_1$ to direction $D_2$ to direction $D_2$ it is necessary to rotate the mirror supporting circle by an angle $\beta/2$. It is this movement which is assured by appropriate means described relative to FIGS. 3 and 4.

The solar sensor shown in FIG. 3 comprises a plurality of mirrors designed by $M_0$ (base mirror), $M_1$, $M_2$, $M_3$ etc. and $N_1$, $N_2$, $N_3$ etc. These mirrors are fixed to a chassis 3 in such a way that they are disposed on a portion of cylinder 2. Cradle 10 which is integral with chassis 3 has a lower face 12 which is a portion of cylinder 2 and rotates without sliding on the cylindrical face 14 of a cradle 16. The radius of curvature of face 14 is equal to double the radius of curvature of portion 12, and two centres being located on the same side relative to the generatrix of tangency. In the normal position the central generating line of base mirror $M_0$ passes through the contact zone of the two cradles 10 and 16. Obviously a similar arrangement is provided at the other end of the mirrors. Receiver 18 of linear configuration is arranged on axis 4 of the cylinder corresponding to face 14. As has been explained hereinbefore, the receiver is completely stationary because it occupies a fixed position and receives the reflected rays in a direction independent of the sun's position which means that it does not have to be oriented.

The rotation without sliding of cradle 10 on cylinder portion 16 can be obtained by any known means and more particularly by teeth integral with each of the members 10 and 16 and a motor controlling the rotation of cradle 10. However, according to an advantageous embodiment the already indicated property is used according to which a point linked with a circle which rotates without sliding on a circle of double the radius moves along a diameter of the large circle. To this end the displacement means comprise according to a first embodiment illustrated in FIG. 4a a rod 20 terminated by a ring 22 and positioned in accordance with a diameter D of cylinder portion 14. The rotation axis of the ring coincides with a generating line of the small cylinder 12. Rod 20 effects a translational movement along diameter D as a result of a motor 24 which actuates a rack and pinion system 26. As the ring is moved rectilinearly along diameter D of the large circle by rod 20 the articulation point integral with cylinder 12 describes diameter D which means that the cylinder portion 10 rotates without sliding on cylinder portion 16.

In FIG. 4b illustrating a second embodiment of the displacement means, a further rack and pinion system 28–30 is shown whose pinion is articulated on a generating line of the small cylinder 12 whilst the rack 30 is integral with the large cylinder 14 and parallel to a diameter of the latter.

Figure 5:
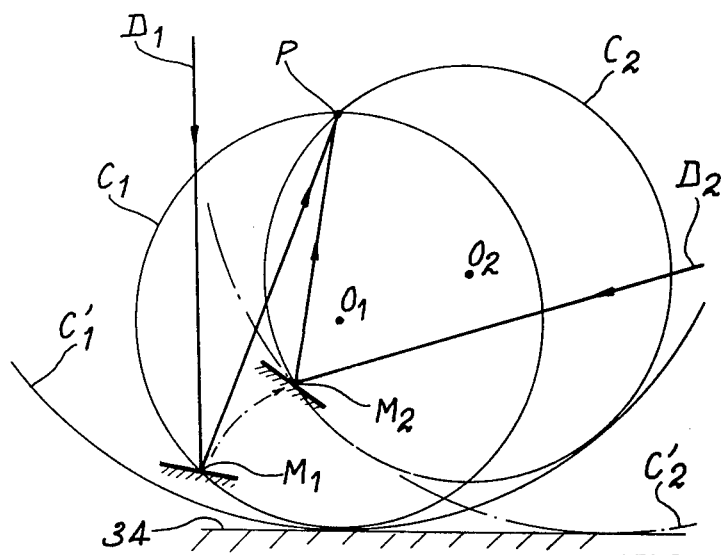
FIG. 5, a geometrical representation illustrating the second variant of the invention in which the supporting cylinder is integral with a cylinder having double the radius which rotates without sliding on a plane.

In the second variant of the invention, means are provided for the rotation without sliding of a cylinder portion whose radius is equal to the diameter of the mirror supporting cylinder and tangential to said supporting cylinder on a plane. FIG. 5 is a geometrical representation explaining the operation of said variant.

In a first position, the course of the large cylinder in the plane of the drawing occupies position $C'_1$ and the course of the small cylinder position $C_1$. Solar rays from direction $D_1$ are focussed at P. In a second position the large cylinder arrives at $C'_2$ by rotating without sliding on plane 34. The small cylinder which is integral with the large cylinder arrives at position $C_2$ and the solar rays then come from direction $D_2$. Each mirror describes a cycloidal curve in this movement and passes from an initial position $M_1$ to a final position $M_2$.

Geometrical considerations show that if the cylinder rotates without sliding on horizontal plane 34 the reflected rays still converge in the vicinity of point P which remains substantially fixed at least at a first approximation.

Figure 6:
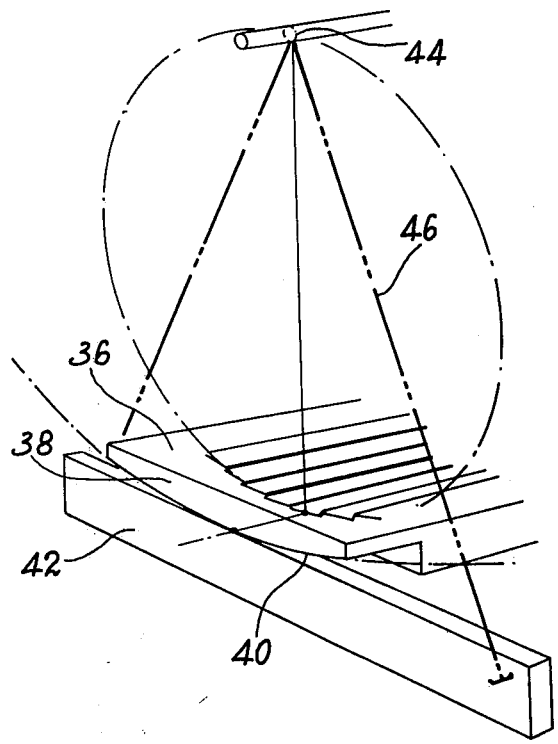
FIG. 6, in perspective the solar sensor in said second variant.

In this second variant the sensor is as shown in FIG. 6. Cradle 36 which supports the mirrors is integral with a cradle 38 whose lower face 40 has a radius of curvature equal to the diameter of the mirror supporting cylinder and is tangential to said cylinder along the central generating line of the base mirror. Face 40 rotates without sliding on a planar support 42. This movement can be obtained by means of teeth integral with the cylinder and the plane and a motor which rotates the cradle 38. Receiver 44 occupies a fixed position and can be fixed to a frame 46 joined to planar support 42.

In the two variants described hereinbefore the displacement movement of the mirror system can be controlled by a motor itself controlled by the position of the sun. These means are not described here because they are well known and do not form part of the invention. However, it is pointed out that it can be a conventional solar sensor, for example of the heliograph type which supplies an error signal proportional to the variation between the direction from which the solar rays come and a reference direction. This error signal controls the motor which acts on the moving cylinders.

The control of the movement of the mirrors as a function of the sun's position can be effected either permanently in which case the mirror system is permanently rotated, or intermittently when the system of mirrors is only readjusted at certain chosen times, for example once or twice a day as a function of the variation of the daily declination of the sun, or every few days as a function of the variation of the seasonal declination of the sun.

The invention is not limited to the embodiments described and represented hereinbefore and various modifications can be made thereto without passing beyond the scope of the invention.

What is claimed is:

1. A solar sensor with linear concentration comprising: a system of elementary segmental mirrors arranged along the generating lines of a cylinder portion and directing the solar rays to a zone located in the vicinity of a generating line of said cylinder portion, and a receiver of linear configuration located in said zone, said receiver being stationary, and means for ensuring that the mirror system is subject to a rotational movement without sliding movement in such a way that the zone towards which the reflected rays are directed remains fixed and the direction of said reflected rays remains unchanged when the position of the sun changes, said means comprising the first cylinder portion which supports the mirrors and a second fixed cylinder portion whose radius is equal to the diameter of the first cylinder portion and whose axis coincides with the receiver.

2. A solar sensor according to claim 1, wherein the mirrors are cylindrical and have a radius equal to double the diameter of the cylinder portion supporting the same.

3. A solar sensor according to claim 1, wherein the said means are able to move a point of a generating line of the mirror supporting cylinder along a diameter of the fixed cylinder having a double radius.

4. A solar sensor according to claim 3, wherein said means comprise a rack and pinion assembly.

5. A solar sensor with linear concentration comprising: a system of elementary segmental mirrors arranged along the generating lines of a first cylinder portion and directing the solar rays to a zone located in the vicinity of a generating line of said cylinder portion and a receiver of linear configuration located in said zone, said receiver being stationary, and means for ensuring that the mirror system is subject to a rotational movement without sliding movement in such a way that the zone towards which the reflected rays are directed remains fixed and the direction of said reflected rays remains unchanged when the position of the sun changes, said means comprising the first cylinder portion supporting the mirrors, and a second cylinder portion integral with said first cylinder portion and whose radius is double that of the first cylinder portion and which is tangential to the first cylinder portion,, and also comprising means which permit the rotation of said second portion on a plane without sliding.

* * * * *